United States Patent [19]

Aklian et al.

[11] Patent Number: 5,521,012
[45] Date of Patent: May 28, 1996

[54] STORAGE STABLE, WATER BORNE, ZINC CONTAINING COATINGS

[75] Inventors: Jak Aklian, N. Hollywood; Stacy A. B. Evans, Duarte, both of Calif.; Michael Hickling, Louisville, Ky.; Kathrine J. Lewis, Canoga Park, Calif.

[73] Assignee: Courtaulds Coatings, Louisville, Ky.

[21] Appl. No.: 440,809

[22] Filed: May 15, 1995

[51] Int. Cl.⁶ .............................. B32B 15/08; B32B 27/38
[52] U.S. Cl. ...................... 428/418; 427/386; 427/388.4; 524/783
[58] Field of Search ................... 427/385.5, 386, 427/388.1, 388.4; 428/418; 524/783

[56] References Cited

U.S. PATENT DOCUMENTS

| | | | |
|---|---|---|---|
| 3,653,930 | 4/1972 | Law et al. | 106/3 |
| 4,120,655 | 10/1978 | Crambes et al. | 422/15 |
| 4,219,358 | 8/1980 | Hayashi et al. | 106/1.17 |
| 4,689,201 | 8/1987 | Longworth et al. | 422/16 |
| 4,954,553 | 9/1990 | Johnson et al. | 428/457 X |

FOREIGN PATENT DOCUMENTS

4323062A1  1/1995  Germany.

*Primary Examiner*—Michael Lusignan
*Attorney, Agent, or Firm*—Gifford, Krass, Groh, Sprinkle, Patmore, Anderson & Citkowski

[57] ABSTRACT

There is disclosed herein a storage-stable, water-borne, zinc-containing coating. The coating inhibits corrosion of steel and other ferrous or metal materials more noble than zinc. The coating composition includes an aqueous polymer composition, a temporary zinc-inhibitor or combinations thereof, and zinc powder. There is also disclosed a method of making an anti-corrosion coating, as well as a method of coating a metal material.

26 Claims, No Drawings

STORAGE STABLE, WATER BORNE, ZINC CONTAINING COATINGS

BACKGROUND OF THE INVENTION

1. Field of the Invention

This invention relates generally to methods and compositions for preventing corrosion, and in particular, to methods and compositions for inhibiting corrosion on the surface of steel and other ferrous or metal materials. Most specifically, the present invention relates to a low VOC, water-borne, zinc-rich corrosion inhibitire coating for a wide variety of ferrous materials, and other metal materials more noble than zinc.

2. Description of the Prior Art

Uncoated steel, and other ferrous or metal materials will begin to rust and corrode upon exposure to the atmosphere. The iron in steel and other ferrous materials electrochemically interacts with atmospheric oxygen to form a reddish corrosion product, ferric oxide ($Fe_2O_3$). The reaction occurs most rapidly in moist air, indicating the catalytic activity of water. The formation of red rust is often times undesirable because it compromises the integrity of the iron product. The red rust can also undesirably stain or rub off on other materials with which the iron product may come into contact.

In order to prevent the problem of red rust formation, it has been known to coat the surface of the iron material with a zinc dust-containing coating. Once in electrical contact with the steel surface, the zinc metal then cathodically protects the steel by corroding sacrificially. This sacrificial corrosion is evidenced by the formation of desirable white rust.

Zinc is a fairly reactive metal, and in the presence of water, it can react to generate hydrogen. This outgassing consumes the zinc, lessening the protective capacity of the coating, and it can be a problem in and of itself. Until recently, most zinc-dust-loaded coatings for protecting steel were made utilizing organic solvents as carriers. Problems such as extensive outgassing, as well as rapid consumption of the active zinc did not occur because there was little or no moisture exposure in these hydrophobic environments to corrode the zinc. Hence, inhibitors of the zinc dust itself were usually not required.

Because of increasing concern over the detrimental effects of volatile organic emissions from metal finishing coatings, as well as the rest of the paint industry, water-borne coatings have substantially increased in popularity. However, the development of low VOC, water-borne, zinc-rich corrosion-inhibitive coatings has presented several problems which did not exist in the analogous solvent-borne systems. The addition of water to the zinc-containing coatings generates hydrogen gas which is highly undesirable in closed systems. Also, water-borne systems have shown inherently poorer capabilities to protect the steel against corrosion.

Currently, the most widely used inhibitors for permanently passivating most light, active metals in aqueous corrosive environments, and therefore eliminating the gassing problem, are the alkaline earth and zinc salts of hexavalent chromium. They vary mostly in their degree of water solubility (in the order of $Mg > Ca > Sr \geq Zn$) and to a much smaller extent in their pH ($Sr > Ca > Mg >$). The chromate anion is the active species. For the most part, low solubility strontium and zinc chromates are what have been used in metal primer coatings. The use of hexavalent chromium is undesirable, however, because it electrochemically passivates the zinc metal, thus reducing the ability of the zinc to cathodically protect the steel. Furthermore, the use of hexavalent chromium is an environmentally unacceptable solution to this problem.

The chromate ion, which is an excellent corrosion inhibitor for many metals, has been one of the most widely used for almost a hundred years. It has been used extensively as a paint pigment in metal primer coatings. For the past ten years, however, it has also been recognized as toxic and carcinogenic, and because of its health risks, has become highly regulated. With pressure for elimination being exerted by government regulations, continued use of chromium is incurring ever increasing economic penalties. Hence, there is a need for non-toxic substitutes, both from an economic and an environmental standpoint.

The present invention overcomes all of the above problems of the various prior art approaches by minimizing the problem of hydrogen outgassing, while simultaneously improving the corrosion-inhibition capabilities of non-chromate-containing, water-borne, zinc-rich coatings.

The present invention provides for water-borne, zinc-dust-loaded coatings which can be used for the protection of steel and other metals more noble than zinc. These coatings will perform this function in an environmentally friendly manner that will comply with all the latest regulations for low VOC and freedom from heavy toxic metals. These and other advantages of the present invention will be readily apparent from the description, discussion, and examples which follow.

SUMMARY OF THE INVENTION

There is disclosed herein a low VOC, water-borne, zinc-rich corrosion inhibitive coating. The coating composition comprises an aqueous polymer composition, a temporary inhibitor or combination of temporary and traditional corrosion inhibitors to stabilize zinc dust in the water-borne coating, and zinc dust.

In particular embodiments, the aqueous polymer composition comprises a reactive polymer emulsion. One particularly preferred polymer emulsion comprises water-reducible epoxy-based polymer emulsions. The temporary inhibitor is preferably an amine. One preferred group of amines comprises high base-strength, hydrophobic amines which stabilize zinc dust during storage in the aqueous medium, but become inactive during film formation so as not to impede the sacrificial corrosion of the zinc metal in the dried film. The composition may also include ancillary ingredients such as pigments, fillers, cross-linking agents, defoaming agents, flow control agents, plasticizers, solvents, or other corrosion inhibitive additives.

DETAILED DESCRIPTION OF THE INVENTION

The present invention is directed to a zinc dust-loaded, aqueous coating for the prevention of red rust formation in ferrous and other metal materials. The invention is directed to the use of complexing agents to stabilize zinc dust in water-borne coatings. While in an aqueous phase, these temporary inhibitors serve to stabilize the zinc, and thereby prevent extensive outgassing from corrosion of the zinc on storage in the water-borne liquid medium. Upon drying and/or curing of the coating, these temporary inhibitors become fully or partially disassociated from the zinc, thereby allowing sacrificial corrosion of the zinc in the final dried film. This ultimate sacrificial corrosion of zinc in the "use environment" then cathodically protects the steel (or other metal less noble than zinc) to which the coating is applied.

In the broadest sense, the present invention includes a mixture of an aqueous polymer composition, a zinc dust or powder, and a temporary inhibitor of the zinc dust. Specifically, the zinc dust is dispersed as a fine particle size, preferably less than ten microns, and most preferably to less than five microns. For thick film applications, the zinc dust can be ground to a larger particle size, the size being dependent upon the film thickness, as is known in the art. The zinc is loaded to a level of 30–60% by volume in the dried film, preferably to a level of 40–50% by volume.

The zinc is carried in an aqueous polymer composition. The polymer composition can be any composition capable of existing in an aqueous phase such as aqueous polymer emulsions, dispersions, resins, water soluble polymers, and the like. The dispersed phase of the polymer composition is preferably a reactive polymer, more preferably an epoxy-based or acrylic-based polymer, and most preferably water-reducible resin. A reactive polymer is one which will dry and/or cure upon exposure to heat, irradiation, ambient atmospheric conditions, or through the addition of a chemical cross-linking or curing agent, and includes single and multi-component type systems, as is known in the art. In one preferred formulation, the polymer composition comprises a mixture of water, a glycol ether solvent, a water-dispersable epoxy-based resin and other additives suitable to allow appropriate film formation for a particular end use.

A temporary inhibitor for the zinc dust is added to the aqueous polymer composition in order to stabilize the zinc dust while in an aqueous phase. The temporary inhibitor comprises any complexing agent or combinations thereof, which will stabilize the zinc while in an aqueous phase, but will allow the zinc to sacrificially corrode in a dried film. A temporary inhibitor is one that will stabilize zinc dust during storage in an aqueous medium, but becomes inactive during film formation as a zinc inhibitor so as not to impede the sacrificial corrosion of the zinc metal in a dried film. Preferably, the temporary inhibitor comprises a medium volatility zinc-complexing agent such as an amine. The amine can be either hydrophobic, hydrophilic, or combinations thereof. More preferably, the inhibitor comprises a high base-strength amine. One preferable group of amines comprises those with pK>7. Another preferable group comprises tertiary, hydrophobic, aliphatic amines, or hydroxy-functional amines. In a multi-component system, the amine can comprise a polyamine which then functions as both a temporary zinc inhibitor and a curing agent for the coating composition. Some preferable amines comprise triethylamine, tributylamine, pyridine, dimethylaminoethanol, and combinations thereof. The relatively hydrophobic, high base-strength amine triethylamine is a most preferred temporary inhibitor.

The amount of a temporary zinc inhibitor to be added to a given coating is dependent upon the aqueous polymer composition. In a formulation utilizing a water-reducible epoxy-based resin, the presence of triethylamine at approximately 1% by weight of liquid paint (and approximately 66% by weight zinc powder) significantly reduced the outgassing of the zinc in the water-borne paint. Additionally, the triethylamine did not impede the dry film corrosion inhibition afforded by the zinc metal. Therefore, the steel corrosion inhibition of coatings utilizing this invention was improved. The addition of two to four times more than the 1% triethylamine did not further enhance these effects.

In another embodiment, the temporary inhibitor of the present invention can also be used in combination with chromate or other traditional inhibitors in a corrosion-inhibiting coating. Traditional inhibitors are commercially available materials such as metal phosphates, silicates, chromates, and borates, and/or benzo-thiazole derivatives. In one embodiment, a temporary and traditional zinc-inhibitor are combined such that part of the zinc surface in the dried paint is immediately opened for sacrificial corrosion in order to begin the protection of steel or other less noble metal substrates, while the rest of the zinc surface is more slowly exposed by other physical or chemical processes which are time- or environmental-dependent. The combination of temporary and traditional zinc-inhibitors can comprise a volatile amine and a non-volatile organic or inorganic corrosion inhibitor that will more gradually expose the zinc surface by time- or environment-dependent processes such as water-leaching or physical disruption from outgassing. In one preferred embodiment, the combination of temporary and traditional inhibitors comprises triethylamine or dimethylaminoethanol and an inorganic inhibitor such as a metal phosphate. In another formulation, triethylamine can be added to a coating containing low levels of strontium chromate to add additional stabilization to the coating. Other combinations of inhibitors are also contemplated by this invention.

The present invention further comprises the addition of other optional or ancillary materials such as pigments, fillers, cross-linking agents, defoaming agents, flow control agents, plasticizers, solvents, other corrosion inhibitive additives, and the like, as is known in the art.

The compositions of the present invention may be prepared by simply mixing the components together. Preferably, the polymer composition is first disposed within a mixing tank. Thereafter, the temporary inhibitor is added to the tank and mixing is begun utilizing a high speed disperser. Thereafter, the zinc dust is added and mixing is continued at high speed until adequate dispersion is achieved for the particular use.

The coating thus made is then used to coat steel and other ferrous or metal materials. The coatings are applied to the article in any conventional application method and drying is achieved through chemical cure, ambient air dry or other conventional means appropriate to the particular polymer chemistry, including heat or irradiation.

The present invention will thus be illustrated by the following series of examples. A series of compositions were prepared and were tested for outgassing and corrosion inhibition. Each of the compositions included zinc dust of approximately 4 micron particle size; together with a conventional water based resin, which in this case was an epoxy-based resin. The compositions also included a water-miscible solvent, which in this case comprised a butoxy ethanol/butanol blend. Data was gathered at 1.5, 3 and 7 day intervals. Corrosion inhibition tests were run using salt spray testing. This method involved coating steel strips, and then scoring the coatings to leave some uncoated area of the strip exposed. Visual evaluation was made with respect to white zinc rust formation and red steel rust formation.

SAMPLE 1

This sample was formed by mixing together the following components: 296.51 grams zinc dust; 128.57 grams water; 40.91 grams water-reducible epoxy-based resin; 25.32 glycol ether/alcohol solvent; and 2.84 grams strontium chromate.

SAMPLE 2

This sample was formed by mixing together the following components: 296.51 grams zinc dust; 134.75 grams water;

40.91 grams water-reducible epoxy-based resin; 25.32 grams glycol ether/alcohol solvent; and 2.84 grams strontium chromate.

SAMPLE 3

This sample was formed by mixing together the following components: 296.51 grams zinc dust; 131.66 grams water; 40.91 grams water-reducible epoxy-based resin; and 25.32 grams glycol ether/alcohol solvent.

SAMPLE 4

This sample was formed by mixing together the following components: 296.51 grams zinc dust; 131.66 grams water; 40.91 grams water-reducible epoxy-based resin; 25.32 grams glycol ether/alcohol solvent; and 0.05 grams triethylamine.

SAMPLE 5

This sample was formed by mixing together the following components: 296.51 grams zinc dust; 131.66 grams water; 40.91 grams water-reducible epoxy-based resin; 25.32 grams glycol ether/alcohol solvent; and 1 gram triethylamine.

SAMPLE 6

This sample was formed by mixing together the following components: 296.51 grams zinc dust; 131.66 grams water; 40.91 grams water-reducible epoxy-based resin; 25.32 grams glycol ether/alcohol solvent; and 2.50 grams triethylamine.

SAMPLE 7

This sample was formed by mixing together the following components: 296.51 grams zinc dust; 131.66 grams water; 40.91 grams water-reducible epoxy-based resin; 25.32 grams glycol ether/alcohol solvent; and 5 grams triethylamine.

SAMPLE 8

This sample was formed by mixing together the following components: 296.51 grams zinc dust; 131.66 grams water; 40.91 grams water-reducible epoxy-based resin; 25.32 grams glycol ether/alcohol solvent; and 10 grams triethylamine.

SAMPLE 9

This sample was formed by mixing together the following components: 296.51 grams zinc dust; 131.66 grams water; 40.91 grams water-reducible epoxy-based resin; 25.32 grams glycol ether/alcohol solvent; and 4.60 grams tributylamine.

SAMPLE 10

This sample was formed by mixing together the following components: 296.51 grams zinc dust; 131.66 grams water; 40.91 grams water-reducible epoxy-based resin; 25.32 grams glycol ether/alcohol solvent; and 2.20 grams dimethylaminoethanol.

SAMPLE 11

This sample was formed by mixing together the following components: 296.51 grams zinc dust; 131.66 grams water; 40.91 grams water-reducible epoxy-based resin; 25.32 grams ether/alcohol solvent; and 4.40 grams of dimethylaminoethanol.

| Inhibitor | | OUT GAS (cc)** | | | SALT SPRAY*** | | | | | |
|---|---|---|---|---|---|---|---|---|---|---|
| | | 1.5 | 3 | 7 | 1.5 day | | 3 day | | 7 day | |
| ID | Formula* | day | day | day | WR | RR | WR | RR | WR | RR |
| 1 | 0.6% SrCrO4 | 0 | 0 | 0 | 2 | 2 | 2 | 3 | 2 | 3 |
| 2 | 0.6% SrCrO4 | 0 | 0 | 0 | 1 | 2 | 1 | 2 | 1 | 2 |
| 3 | None | 8.4 | 10.9 | 18.6 | 4 | 0 | 4 | 0 | 4.5 | 0.5 |
| 4 | 0.01% TEA | 8.4 | 11.0 | 19.2 | 4 | 0 | 4 | 0 | 4.5 | 0.5 |
| 5 | 0.2% TEA | 5.4 | 7.1 | 12.8 | 3.5 | 0 | 3.5 | 0.5 | 3.5 | 0.5 |
| 6 | 0.5% TEA | 1.1 | 1.7 | 3.9 | 3.5 | 0 | 3.5 | 0.5 | 3.5 | 1 |
| 7 | 1% TEA | 0 | 0.3 | 1.9 | 3.5 | 0 | 3.5 | 0.5 | 3.5 | 1.5 |
| 8 | 2% TEA | 0 | 0.4 | 2.2 | 3.5 | 0 | 3.5 | 0.5 | 3.5 | 1 |
| 9 | 0.92% TBA (moles = 0.5% TEA) | 6.5 | 8.4 | 14.0 | 4 | 0 | 4 | 0.5 | 4 | 0.5 |
| 10 | 0.44% DMAE (moles = 0.5% TEA) | 3.8 | 5.3 | 10.3 | 3 | 0 | 3 | 0.5 | 3 | 1 |
| 11 | 0.88% DMAE (moles = 1% TEA) | 1.9 | 2.9 | 6.8 | 3 | 0 | 3 | 0.5 | 3 | 1 |

*TEA = triethylamine
TBA = tributylamine
DMAE = dimethylaminoethanol
SC = strontium chromate
**Volume gas evolved from 15 g paint
***0 = none, 1 = trace, 2 = slight, 3 = some, 4 = much, 5 = very much
WR = white zinc rust
RR = red steel rust
At 0.5 rating, microscope is required to observe red rust As can be seen in the above table, the presence of chromate by itself in the aqueous, zinc-dust coating inhibited outgassing, but decreased the protective effects of the zinc. The presence of amine, particularly triethylamine, in an amount of at least 0.5% by weight, greatly reduced outgassing, but had no significant detrimental effect on corrosion protection.

The following are other preferable formulations. All are expressed in weight percentages.

| Formulation 1 | |
|---|---|
| Araldite 3907 (epoxy-based resin manufactured by Ciba Polymers) | 14% |
| Cymel 303 (cross-linking agen manufactured by Cytec) | 2% |
| Ethoxy ethyl propanol | 1% |
| Zinc powder | 65% |
| Triethylamine | 1% |
| DI Water | 17% |
| Formulation 2 | |
| Epirez 3540 (epoxy-based resin manufactured by Shell USA) | 20% |
| Cymel 303 | 2% |
| Ethoxy ethyl propanol | 2% |
| Zinc powder | 65% |
| Triethylamine | 1% |
| DI Water | 10% |
| Formulation 3 | |
| Rhoplex AC1803 (acrylic-based resin manufactured by Rohm & Haas) | 25% |
| Cymel 303 | 2% |
| Ethoxy ethyl propanol | 3% |
| Zinc powder | 65% |
| Dimethylamino ethanol | 0.2% |
| Triethylamine | 1% |
| DI Water | 2.8% |
| Formulation 4 | |
| Part A | |
| Epirez 5522-WY-55 (two-part epoxy-based resin manufactured by Shell USA) | 23% |
| Diacetone alcohol | 0.3% |
| Water | 2.5% |
| Part B | |
| Epi-cure 8292-Y-60 (polyamine curing agent manufactured by Shell USA) | 2.9% |
| Water | 5.3% |
| Triethylamine | 1% |
| Zinc powder | 65% |

The two parts are mixed just prior to application of the coating.

The foregoing discussion and examples are merely meant to illustrate particular embodiments of the invention, and are not meant to be limitations upon the practice thereof. It is the following claims, including all equivalents, which define the scope of the invention.

What is claimed is:

1. A corrosion-inhibitive coating composition for metal materials comprising effective film-forming amounts of:
   zinc powder;
   an aqueous polymer composition, said aqueous polymer composition comprising aqueous polymer emulsions, dispersions, water soluble polymers, single-component polymer systems, multi-component polymer systems, or combinations thereof; and
   a non-chromate, temporary zinc inhibitor, said non-chromate, temporary zinc inhibitor present in an amount sufficient to stabilize said zinc powder while in an aqueous medium, whereby said non-chromate, temporary zinc inhibitor becomes at least partially disassociated from said zinc powder upon film formation, said inhibitor comprising amines, polyamines, or combinations thereof.

2. The coating composition of claim 1, wherein said zinc powder is a particle size of less than ten microns.

3. The coating composition of claim 1, further comprising a traditional corrosion inhibitor.

4. The coating composition of claim 1, wherein said aqueous polymer composition further comprises a reactive polymer.

5. The coating composition of claim 4, wherein said reactive polymer comprises an epoxy-based resin.

6. The coating composition of claim 4, wherein said reactive polymer comprises an acrylic-based resin.

7. The coating composition of claim 1, further comprising a compound selected from the group consisting of pigments, fillers, cross-linking agents, defoaming agents, flow control agents, plasticizers, additional corrosion-inhibitive additives, solvents, and combinations thereof.

8. The coating composition of claim 1, wherein said temporary zinc inhibitor comprises an amine.

9. The coating composition of claim 8, wherein said amine comprises a zinc-complexing amine.

10. The coating composition of claim 9, wherein said amine comprises a high base-strength amine of pK>7.

11. The coating composition of claim 10, wherein said amine comprises a tertiary, hydrophobic, aliphatic amine.

12. The coating composition of claim 10, wherein said amine comprises a hydroxy-functional amine.

13. The coating composition of claim 8, wherein said amine comprises a compound selected from the group consisting of triethylamine, tributylamine, dimethylaminoethanol, pyridine, and combinations thereof.

14. The coating composition of claim 8, wherein said amine comprises a polyamine, said polyamine serving as a temporary zinc inhibitor and a curing agent in a multi-component system. START 15. A process for preparing a coating composition for metal materials comprising the steps of:
   disposing an effective film-forming amount of an aqueous polymer composition in a mixing vessel;
   adding an effective film-forming amount of a non-chromate, temporary zinc inhibitor to said mixing vessel, the inhibitor comprising amines, polyamines or combinations thereof;
   adding an effective film-forming amount of a zinc powder to said mixing vessel, thereby forming a mixture; and
   mixing said mixture.

16. The process of claim 15, wherein said mixing is begun prior to addition of said zinc powder.

17. The process of claim 15, wherein said mixture is mixed until a dispersion is obtained appropriate to a particular end use.

18. The process of claim 15, further comprising adding a compound selected from the group consisting of pigments fillers, cross-linking agents, defoaming agents, flow control agents, plasticizers, additional corrosion-inhibitive additives, solvents, and combinations thereof.

19. A process for protecting a ferrous metal article from corrosion comprising the steps of:
   providing a coating composition comprising effective film-forming amounts of an aqueous polymer composition, zinc powder, and a non-chromate temporary zinc inhibitor, the inhibitor comprising amines, polyamines or combinations thereof;
   applying said coating composition to a metal-containing article; and
   drying said coating composition on said article.

20. The process of claim 19, wherein said non-chromate, temporary zinc inhibitor comprises a volatile compound and the step of drying is carried out until substantially all of said volatile compound is evaporated from said coating.

21. The process of claim 19, wherein said step of drying takes place by exposure of said article to irradiation means.

22. The process of claim 19, wherein said step of drying takes place in an oven.

23. The process of claim 19, wherein said step of drying takes place by exposure of said article to ambient atmosphere.

24. The process of claim 19, wherein said step of drying occurs through chemical cure from a curing agent.

25. The process of claim 24, wherein said curing agent comprises a polyamine, said polyamine also serving as said temporary zinc inhibitor.

26. A metal article coated in accord with the process of claim 19.

* * * * *